March 11, 1947. E. M. MOREHOUSE 2,417,263
CUSHIONED NUT
Filed June 25, 1945

Inventor
EUGENE M. MOREHOUSE
By R. S. Bray
Attorney

Patented Mar. 11, 1947

2,417,263

UNITED STATES PATENT OFFICE 2,417,263

CUSHIONED NUT

Eugene M. Morehouse, Tujunga, Calif., assignor to Adel Precision Products Corp., a corporation of California Application June 25, 1945, Serial No. 601,459

2 Claims. (Cl. 85—36)

This invention has for one of its objects the provision of a cushioned nut which is constructed and arranged so that it may be quickly and easily applied with a screw or like fastening for connecting or joining separate objects or members in cushioned relation to one another or for providing a cushioned mounting of a motor or other mechanism on a support.

Another object of this invention is to provide a combined cushioned nut wherein a pad-like cushion member carries the nut in integral relation thereto with the nut either cemented or vulcanized to the cushion member or embedded or enclosed therein, whereby the nut and cushion form a "one-piece" unit subject to many uses and applications where a cushioned mounting is desired to dampen shocks and vibrations.

Another object of this invention is to provide a nut-cushion unit such as described wherein a flat sheet metal nut is combined with and carried by a pad-like cushion member of soft rubber, synthetic rubber or like resilient material so that the cushion is prevented from being pulled through the screw hole in the member to which it is applied and is effectively reinforced by the nut without having its cushioning action objectionably impaired.

A further object is to provide a cushioned nut in which the cushion encloses the nut and the screw applied thereto, so as to form a seal protecting the nut and screw from exposure to liquids and substances which would corrode or otherwise damage such parts, also insulates the nut and screw, thereby making the nut unit well suited to use interiorly of tanks and for electrical connection purposes, also affording a desirable cushioning action and yieldability as well as forming a seal around the screw opening in the part or member through which the screw is inserted.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Figure 1:
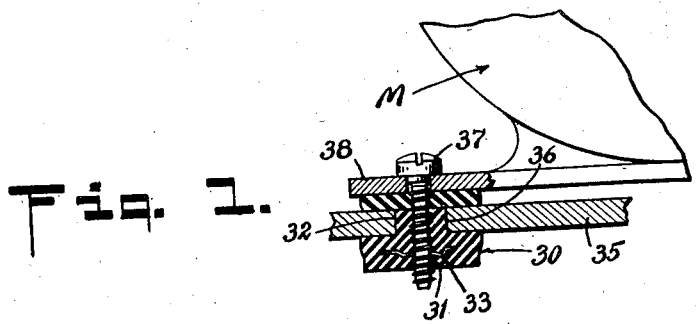
Fig. 1 is a fragmentary sectional view of the nut unit as employed to secure a motor to its base.
Figure 2:
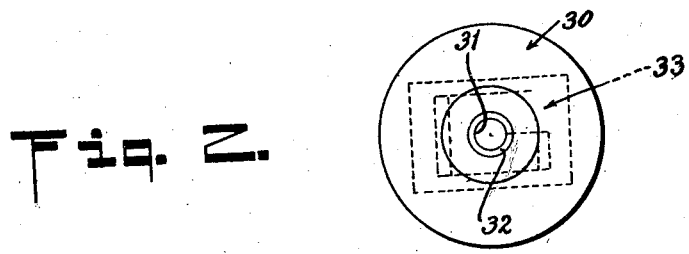
Fig. 2 is a top plan view of the nut unit shown in Fig. 1.

An illustrative form of my invention as shown in the accompanying drawings includes a cushion pad 30 of rubber or the like, here shown of circular form like a washer and provided with a central screw-receiving bore or opening 31 and a boss or protuberance 32 projecting from the center of one side thereof and having the bore 31 continued therethrough.

A sheet metal nut 33 of the type corresponding to the nuts shown in the patent to Ronald E. Eggert, No. 2,379,892, dated July 10, 1945, is embedded in the pad 30 with its opening 34 in registration with the bore 31.

Figure 3:
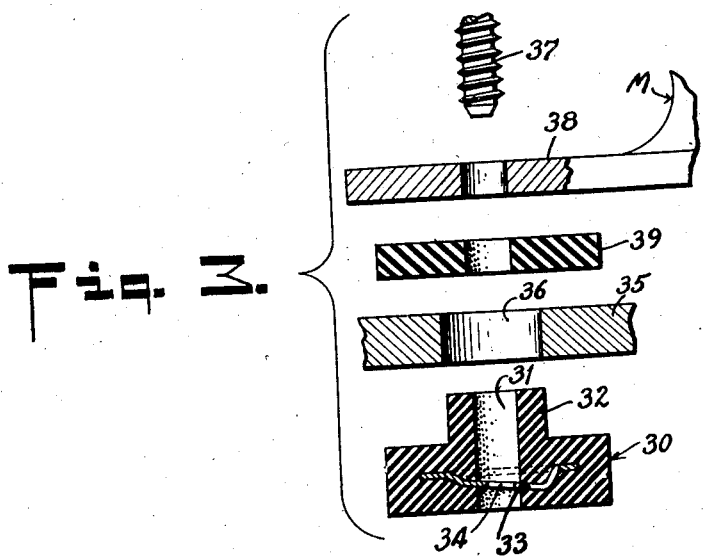
Fig. 3 is an exploded view of the assembly shown in Fig. 1 with parts thereof in elevation and other parts in section.

As shown in Figs. 1 and 3 the nut unit is adapted to be applied to a member 35 having an opening 36 through which the boss or projection 32 is extended so that a screw 37 after passing through a member 38 such as the base of a motor or other object M, may be turned in the bore 31 so as to threadedly engage the embedded nut 33 to secure the object M to said projection. If desired a second cushion pad 39 of the same material as the other pads and made in the form of a washer may be interposed between the members 35 and 38 to provide for a fully cushioned mounting of the motor or object M. Such a mounting will effectively absorb shocks and vibrations transmitted in all directions and fully electrically insulate the connected parts or members.

In all forms of the invention hereof the resilient sheet metal nut will resiliently grip, and lock onto the screw, the resilient locking action being made more effective and reliable by the spring or resilient tension afforded by the elastic pad or cushion carrying the nut, whereby once the nut is tightened it is prevented from working loose due to vibration.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a cushioned nut unit, a pad of elastic cushioning material having a screw-receiving opening therein and a sheet metal nut united with said pad and having a screw-receiving opening therein disposed in registration with the opening in said pad, said pad and nut being so relatively arranged that one face of the pad will contact the member to which the unit is applied while the nut is yieldingly maintained by said pad in outwardly spaced relation to such member, a projection of the same material as the pad extending therefrom for entry into an opening in the member to which the nut unit is applied, through which projection is extended the screw-receiving opening in said pad.

2. In combination, a pair of opposed apertured members adapted to be secured to one another, a pad of cushioning and insulation material interposed between said members and having an opening therein for registration with the apertures in said members, a second cushioning pad, a nut embedded in said second pad, said second pad and nut being disposed on the outer side of one of said apertured members and having openings therein for alignment with the apertures in said members and the opening in said first named pad respectively, a screw inserted through said apertures and openings and threadedly engaged with said nut for effecting a cushioned connection of said members with one another, and a tubular projection of cushioning and insulation material interposed between said pads around said screw to insulate the screw from contact with one of said apertured members and to insulate said members from one another.

EUGENE M. MOREHOUSE.

REFERENCES CITED

The following references are of record in the file of this patent:

UNITED STATES PATENTS

| Number | Name | Date |
|---|---|---|
| 264,527 | Haley | Sept. 19, 1882 |
| 1,636,492 | Taylor | July 19, 1927 |
| 2,257,538 | Schlueter | Sept. 30, 1941 |
| 1,259,224 | Guibert | Mar. 12, 1918 |
| 1,373,778 | Tompkins | Apr. 5, 1921 |
| 2,250,343 | Tigler | July 22, 1941 |